US009835305B2

United States Patent
Natsume et al.

(10) Patent No.: US 9,835,305 B2
(45) Date of Patent: Dec. 5, 2017

(54) VEHICULAR LAMP

(71) Applicant: Koito Manufacturing Co., Ltd., Tokyo (JP)

(72) Inventors: Kazunori Natsume, Shizuoka (JP); Takahiro Totsuka, Shizuoka (JP); Takayuki Suzuki, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 14/960,629

(22) Filed: Dec. 7, 2015

(65) Prior Publication Data

US 2016/0084468 A1    Mar. 24, 2016

Related U.S. Application Data

(63) Continuation of application No. PCT/JP2014/002600, filed on May 16, 2014.

(30) Foreign Application Priority Data

Jun. 11, 2013  (JP) .................................. 2013-123123

(51) Int. Cl.
*F21V 9/00* (2015.01)
*F21S 8/10* (2006.01)
*F21V 8/00* (2006.01)

(52) U.S. Cl.
CPC ............ *F21S 48/225* (2013.01); *F21S 48/215* (2013.01); *F21S 48/2237* (2013.01);
(Continued)

(58) Field of Classification Search
CPC .... G02B 6/002; G02B 6/0035; G02B 6/0011; G02B 6/0033; G02B 6/005; G02B 6/0045;
(Continued)

(56) References Cited

U.S. PATENT DOCUMENTS

| 7,654,721 B2* | 2/2010 | Okada .................. B60Q 1/0041 349/65 |
| 2002/0071267 A1* | 6/2002 | Lekson ................. F21S 48/215 362/610 |

(Continued)

FOREIGN PATENT DOCUMENTS

| CN | 100485482 C | 5/2009 |
| JP | 2002-196151 A | 7/2002 |

(Continued)

OTHER PUBLICATIONS

International Search Report from International Application No. PCT/JP2014/002600 dated Jul. 22, 2014.
International Preliminary Report on Patentability from International Application No. PCT/JP2014/002600 dated Dec. 15, 2015.
SIPO action on patentability, including search report, in counterpart Chinese App. No. 201480033181.6, dated Apr. 18, 2017.

*Primary Examiner* — Elmito Breval
*Assistant Examiner* — Omar Rojas Cadima
(74) *Attorney, Agent, or Firm* — Claire Zopf

(57) ABSTRACT

A vehicular lamp includes a light source; and a light guide disposed such that light emitted from the light source is incident on an end face of the light guide. The light guide emits light, guided into its interior, heading vehicle-forward from an exit face of the light guide running along the light guide's lengthwise extension. The light guide includes reflection steps formed on a surface of the light guide on a side reverse from the exit face, for reflecting light guided into the light-guide interior toward the exit face; and a plurality of diffusion flutes formed on said end face, each being arcuate in substantially horizontal cross-section through said end face, and each being of constant form in substantially perpendicular extension.

5 Claims, 5 Drawing Sheets

(52) U.S. Cl.
CPC ....... *F21S 48/2243* (2013.01); *F21S 48/2268* (2013.01); *G02B 6/002* (2013.01); *G02B 6/0035* (2013.01)

(58) Field of Classification Search
CPC .. G02B 6/0046; G02B 6/0048; G02B 6/0001; F21S 48/215; F21S 48/2237; F21S 48/2268; F21S 48/225; F21S 48/2243; F21S 48/2225; F21S 48/1241; F21S 48/2231; F21S 41/2256; F21S 41/2275; F21S 41/2281; F21S 41/2287; F21Y 2103/003; G01D 11/28; B60Q 1/0011; B60Q 3/002
USPC .................. 362/23.09, 32.16, 511, 615, 628
See application file for complete search history.

(56) References Cited

U.S. PATENT DOCUMENTS

| | | | |
|---|---|---|---|
| 2004/0109664 A1* | 6/2004 | Ohtsuki | G02B 6/0026 385/146 |
| 2006/0082884 A1* | 4/2006 | Feng | G02B 5/1814 359/569 |

FOREIGN PATENT DOCUMENTS

| | | |
|---|---|---|
| JP | 2011-076858 A | 4/2011 |
| JP | 2012-174641 A | 9/2012 |
| JP | 2013-016460 A | 1/2013 |

* cited by examiner

VEHICULAR LAMP

CROSS-REFERENCE TO RELATED APPLICATIONS

This application is based upon and claims the benefit of priority from the prior Japanese Patent Application No. 2013-123123, filed on Jun. 11, 2013 and International Patent Application No. PCT/JP2014/002600, filed on May 16, 2014, the entire content of each of which is incorporated herein by reference.

BACKGROUND OF THE INVENTION

1. Field of the Invention

The present invention relates to vehicular lamps employing light guides.

2. Description of the Related Art

The employing of light guides made of a transparent plastic material in vehicular lamps in order to create distributed light formations has been underway to date. Japanese Unexamined Pat. App. Pub. No. 2013-16460 describes forming, in a vehicular lamp furnished with a light source and a light guide, micro-roughened structure on an entrance face of the light guide, where light from the light source is incident. This is toward enhancing the light-exploitation efficiency, as a result of reducing reflection in the entrance face and increasing light entering the light guide through the entrance face.

Forming a micro-roughened structure on the entrance face as in JP Pub. No. 2013-16460 ends ups dispersing light omnidirectionally after it enters the light guide. The diffusing of light perpendicularly in the light-guide is undesirable from the perspective of creating a distributed light formation in automotive vehicular lamp.

SUMMARY OF THE INVENTION

An object of the present invention, brought about taking into consideration circumstances having been thus, is to afford a vehicular lamp configured to diffuse light horizontally in its light-guide interior, while keeping perpendicular diffusion of light in under control.

A vehicular lamp according to an embodiment comprises: a light source; and a light guide disposed such that light emitted from the light source is incident on an end face of the light guide. The light guide emits light, guided into its interior, heading vehicle-forward from an exit face of the light guide running along the light guide's lengthwise extension. The light guide includes reflection steps formed on a surface of the light guide on a side reverse from the exit face, for reflecting light guided into the light-guide interior toward the exit face; and a plurality of diffusion flutes formed on said end face, each being arcuate in substantially horizontal cross-section through said end face, and each being of constant form in substantially perpendicular extension.

According to the embodiment, the plurality of diffusion flutes extending in the substantially vertical direction, maintaining the same shape, diffuse light in the horizontal direction of the light guide such that diffusion of light in the vertical direction is reduced. Since the light is diffused in the horizontal direction immediately after incidence on the end face, the exit surface in the immediate neighborhood of the end face can emit light.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

Figure 1:
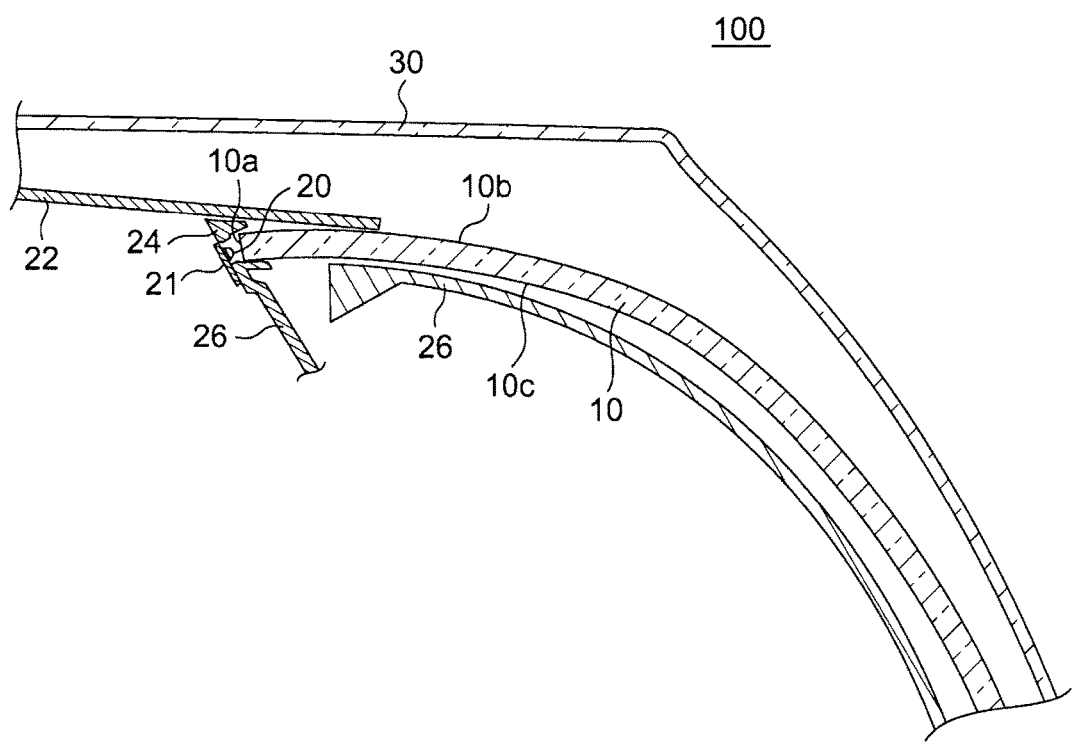
FIG. 1 shows a schematic cross section of the vehicular lamp according to an embodiment of the present invention.

FIG. 1 shows a schematic cross section of a vehicular lamp 100 according to an embodiment of the present invention and shows a horizontal cross section of the vehicular lamp located on the front right of the vehicle.

The vehicular lamp 100 includes a light source 20 and an elongated light guide 10 made of a transparent resin. The light source 20 is a semiconductor light emitting element such as a light emitting diode (LED). The light guide 10 extends and is curved from the neighborhood of the light source 20 in the direction of the width of the vehicle, and extends toward the back of the vehicle.

Figure 3:
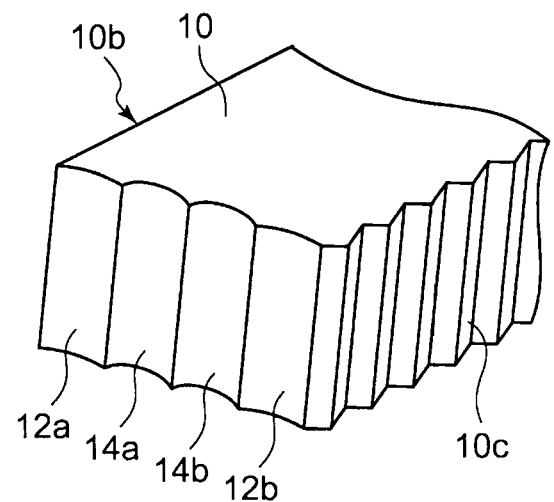
FIG. 3 shows an example of the end face of the light guide.

The light guide 10 is provided so that the light emitted by the light source 20 is incident on one end face 10a. The light guide 10 emits the light guided into the light guide in front of the vehicle from an exit surface 10b along the direction of extension of the light guide. A face 10c opposite to the exit surface 10b is formed with a large number of reflection steps for reflecting the light guided into the light guide 10 toward the exit surface (see FIG. 3). The shape of the cross section perpendicular to the longitudinal axis of the light guide 10 may be uniform in the direction of extension or varies partially.

An outer cover 30 made of a transparent resin is provided over the light guide 10 to face a space in front of the vehicle. A substrate 21 on which the light source 20 is mounted and the light guide 10 are secured to a lamp body 26 adhesively or by setting the substrate 21 and the light guide 10 in the lamp body 26. An extension member 22 is provided between the light source 20 and the outer cover 30 so that the light source 20 is not visible from outside the vehicle.

The vehicular lamp 100 may be used for a variety of purposes such as a clearance lamp (CLL), a daytime running lamp (DRL), a turn signal lamp, or an ornamental lamp. The color of the light emitted by the light source 20 may be varied, or the light guide 10 may be colored, depending on the function of the lamp.

In the related-art vehicular lamp in which a light guide is used, there is a portion of the reflection steps 10c in the neighborhood of the end face (entrance of light) of the light guide where the light is not incident due to the closeness to the end face. This results in a problem in that the exit surface corresponding to that portion of the reflection steps (the exit surface that should otherwise receive the reflecting light from the reflection steps) does not emit light. Concave and convex steps formed on the end face to address the problem will induce regularity in reflection of light inside the light guide and create a difference in brightness (unevenness in light intensity) on the exit surface of the light guide. Formation of a large number of micro-asperities on the end face will induce vertical diffusion of light that is unnecessary in a vehicular lamp.

To address this, the embodiment is configured such that a plurality of diffusion flutes designed to diffuse the light ray immediately upon incidence on the light guide and reduce diffusion of light in the vertical direction are provided on the end face of the light guide on which the light is incident.

Figure 2:
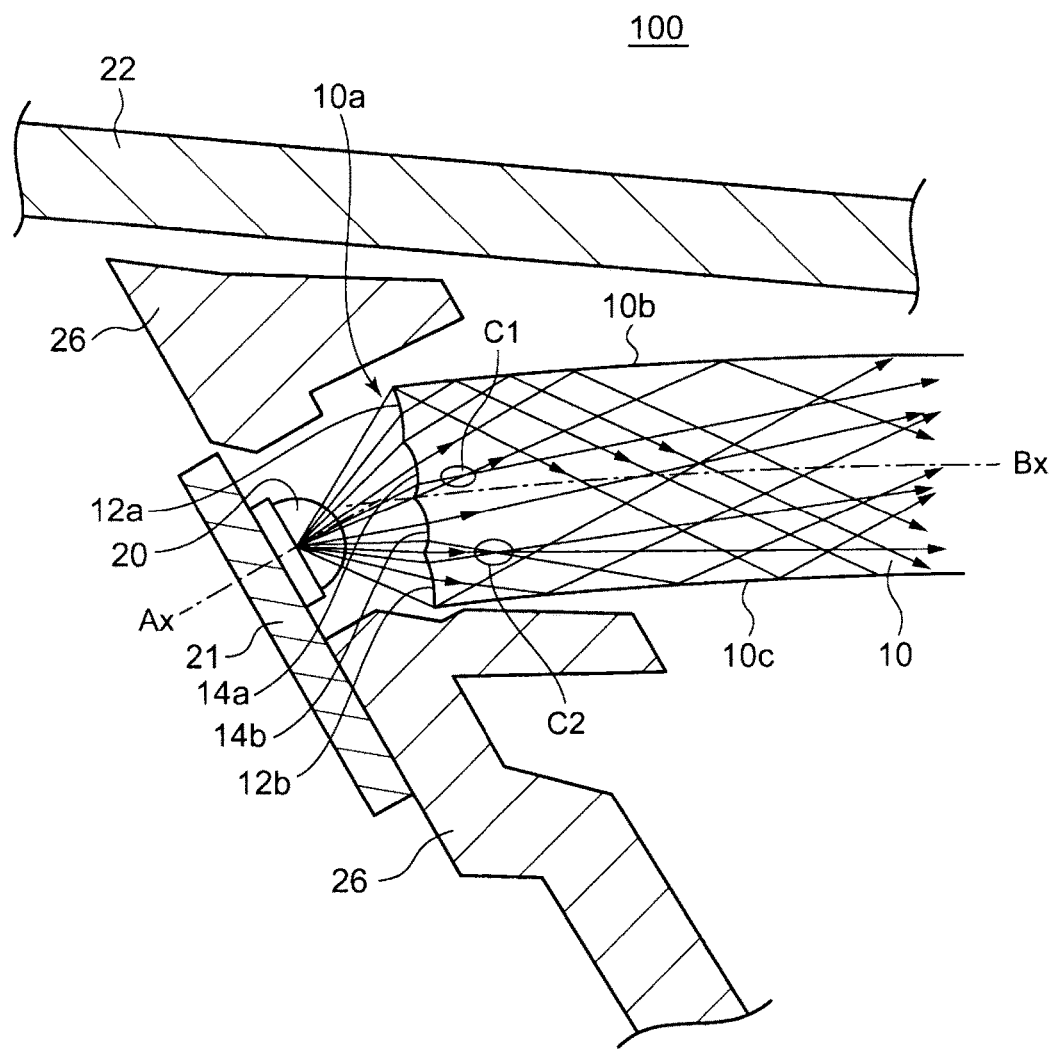
FIG. 2 shows an example of the end face of the light guide.

FIG. 2 shows an example of the end face of the light guide. Arrows in the figure indicate the trace of light ray emitted by the light source 20 and introduced into the light guide 10. A plurality of diffusion flutes 12a, 12b, 14a, and 14b are formed on the end face 10a of the light guide 10. The diffusion flutes 12a, 12b, 14a, and 14b are concave surfaces shaped in arcs in a cross section in the horizontal direction or a direction that approximates the horizontal direction. The diffusion flutes 12a, 12b, 14a and 14b extend in the vertical direction or a direction that approximates the vertical direction, maintaining the same shape. It is relatively easy to work the diffusion flutes to extend in one direction and maintain the same shape in this way.

A light axis Ax of the light source 20 and a longitudinal axis Bx of the light guide are not in alignment but form an angle less than a right angle.

By providing diffusion flutes on the end face 10a and causing the light to be incident on the end face at an angle, the light incident on the end face is hardly diffused in the vertical direction and is diffused primarily in the horizontal direction (the width direction of the light guide). Since the light is diffused immediately after incidence on the end face, the light is equally incident on the reflection steps located in the neighborhood of the end face of the light guide, with the result that the exit surface in the neighborhood of the end face can emit light.

Further, in the example of FIG. 2, the diffusion flutes 14a and 14b located toward the center of the end face 10a are formed to have a smaller radius of curvature of the arc-shaped cross section than the diffusion flutes 12a and 12b located toward the outer ends of the end face 10a. Generally, an LED light source has directivity so that the intensity of light incident on the diffusion flutes 14a and 14b located toward the center of the end face 10a is higher than the intensity of light incident on the diffusion flutes 12a and 12b toward the outer ends of the end face 10a. By configuring the diffusion flutes 14a and 14b toward the center to have a smaller radius of curvature so as to diffuse the light more extensively, the difference in brightness on the exit surface of the light guide in the direction of extension is reduced. By varying the radius of curvature of the diffusion flutes, regularity in reflection of light inside the light guide is reduced so that the difference in brightness on the exit surface of the light guide in the direction of extension is further reduced.

In further accordance with the example of FIG. 2, the light rays diffused by the respective diffusion flutes cross each other in the neighborhood of the border between adjacent diffusion flutes (see C1 and C2 in FIG. 2). As a result of the light rays crossing each other in the neighborhood of the end face 10a, the light can be guided more evenly in the light guide 10. FIG. 2 shows that the border between adjacent diffusion flutes forms an acute angle. In an actual light guide, however, the border between diffusion flutes is slightly rounded due to limitation on the precision of working so that the angle at which the light ray is diffused in the neighborhood of the border between diffusion flutes would be larger than illustrated.

Figure 4:
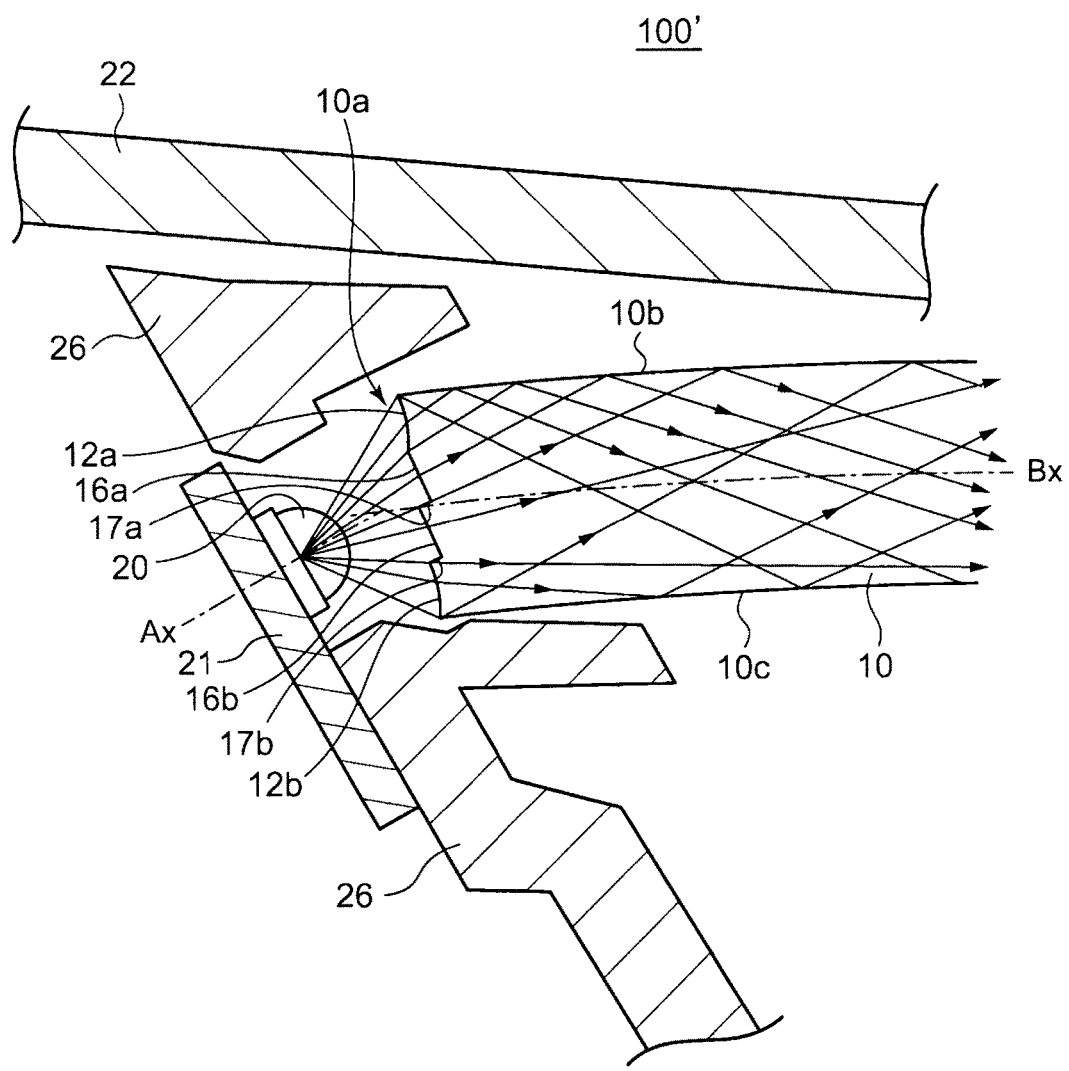
FIG. 4 shows another example of the end face of the light guide.

FIG. 4 shows another example of the end face of the light guide. The end face 10a of the light guide 10 according to this example is also provided with a plurality of diffusion flutes 12a, 12b, 16a, and 16b. The outer diffusion flutes 12a and 12b are identical to those of FIG. 3. The diffusion flutes 16a and 16b toward the center have the same radius of curvature as the diffusion flutes 12a and 12b but are formed to be tilted toward the front of the vehicle. Due to the tilt, a stepped wall 17a is formed between the lower end of the diffusion flute 16a and the upper end of the diffusion flute 16b, and a stepped wall 17b is formed between the lower end of the diffusion flute 16b and the upper end of the diffusion flute 12b. These stepped walls 17a and 17b are formed so that the straight light traveling to the stepped walls from the light source 20 is substantially aligned with the stepped walls in the horizontal cross section. This prevents the incident light from being reduced by being blocked by the stepped walls.

The configuration of the end face as shown in FIG. 4 is useful if the light ray cannot be sufficiently diffused inside the light guide by the configuration of the end face of FIG. 2 or if a difference in brightness in the direction of extension of the exit surface remains due to the special shape of the light guide. The angle of tilt of the diffusion flutes 16a and 16b may be adjusted as appropriate so that the light is incident on dark portions on the exit surface.

Figure 5:
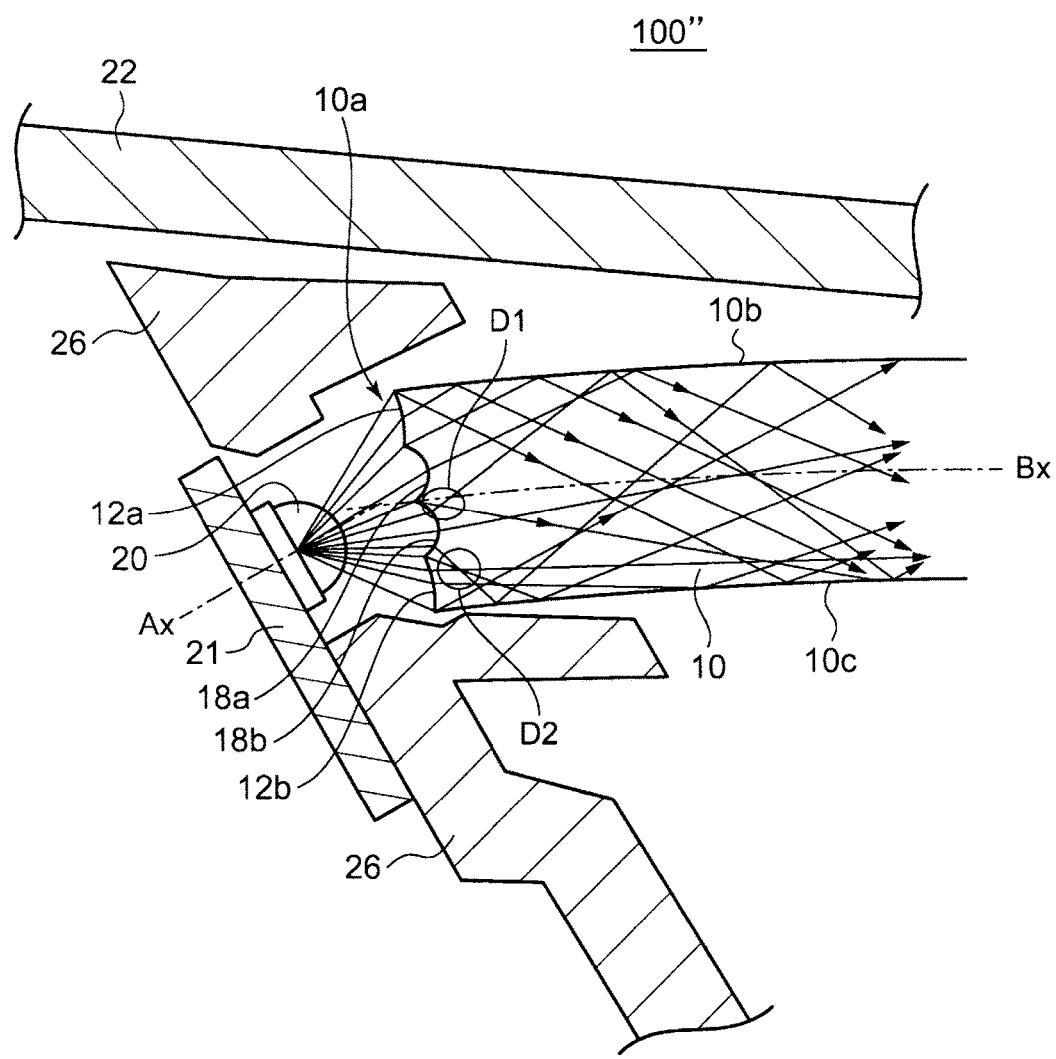
FIG. 5 shows still another example of the end face of the light guide.

FIG. 5 shows still another example of the end face of the light guide. The end face 10a of the light guide 10 according to this example is also provided with a plurality of diffusion flutes 12a, 12b, 18a, and 18b. The outer diffusion flutes 12a and 12b are identical to those of FIG. 3. The bottom of the concave arc-shaped surfaces of the diffusion flutes 18a and 18b toward the center is deeper than that of the diffusion flutes 12a and 12b. These diffusion flutes 18a and 18b are designed so that the same advantage as provided by the diffusion flutes 16a and 16b shown in FIG. 4 having the stepped walls 17a and 17b can be realized by a single curved surface.

In the example of FIG. 5, the light rays diffused by the respective diffusion flutes cross each other in the neighborhood of the border between adjacent diffusion flutes (see D1 and D2 in FIG. 5). As a result of the light rays crossing each other in the neighborhood of the end face 10a, the light can be guided more evenly in the light guide 10. FIG. 5 shows that the border between adjacent diffusion flutes forms an acute angle. In an actual light guide, however, the border between diffusion flutes is slightly rounded due to the limitation on the precision of working so that the angle at which the light ray is diffused in the neighborhood of the border between diffusion flutes would be larger than illustrated.

As described above, according to the exemplary embodiments of the present invention, a plurality of diffusion flutes arc-shaped shaped in the horizontal cross section and extending in the vertical direction, maintaining the same shape, are provided on the end face of the light guide. These diffusion flutes diffuse light in the horizontal direction of the light guide and reduce diffusion of light in the vertical direction. Since the light is diffused in the horizontal direction immediately after incidence on the end face, the exit surface in the immediate neighborhood of the end face can emit light. By shaping the diffusion flutes formed on the end face differently, regularity in the light guided in the end face is reduced so that the difference in brightness on the exit surface is reduced.

The embodiments of the present invention are not limited to those described above and various modifications such as design changes may be made based on the knowledge of a skilled person. The structures shown in the drawings are for illustrative purposes. The structures may be modified as appropriate so long as the same function is achieved. The structures modified as such would provide the same advantage.

In the exemplary embodiments described above, arc-shaped diffusion flutes having a concave cross section are provided on the end face of the light guide. Alternatively, one or a plurality of these diffusion flutes may be convex arc-shaped steps. The difference in brightness can similarly be reduced by adjusting the shape of the convex arc-shaped steps in accordance with the difference in brightness on the light emitting surface of the light guide.

In the embodiments described above, a description is given of a vehicular lamp provided toward the front of a vehicle. Alternatively, the vehicular lamp may be provided toward the back of a vehicle and used as a tail lamp, a stop lamp, etc.

What is claimed is:

1. A vehicular lamp comprising:
    a light source; and
    a light guide disposed such that light emitted from the light source is incident on an end face of the light guide, the light guide emitting light, guided into the light guide interior, heading vehicle-forward from an exit face of the light guide running along the light guide's lengthwise extension; wherein
    the light guide includes
        reflection steps formed on a surface of the light guide on a side reverse from the exit face, for reflecting light guided into the light-guide interior toward the exit face; and
        a plurality of adjacently bordering diffusion flutes formed on said end face, each being arcuate in substantially horizontal cross-section through said end face, and each being of constant form in extension substantially perpendicular to the horizontal cross-section.

2. The vehicular lamp according to claim 1, wherein end-face centrally positioned of the diffusion flutes are formed to have a smaller radius of curvature in arc-shaped cross-section than end-face outer-side positioned of the diffusion flutes.

3. The vehicular lamp according to claim 1, wherein:
    the light guide further includes a stepped wall interconnecting ends of adjoining of the diffusion flutes, whereby
    direct-ray beams traveling from the light source to the stepped wall are substantially collinear with the stepped wall in substantially horizontal cross-section through the end face.

4. The vehicular lamp according to claim 1, wherein the light guide's longitudinal axis is at an angle from the optical axis of the light source.

5. The vehicular lamp according to claim 1, wherein the arcuate cross-section of the diffusion flutes is concave.

* * * * *